United States Patent
Zhang et al.

(10) Patent No.: US 10,843,132 B2
(45) Date of Patent: Nov. 24, 2020

(54) METHOD OF REDUCING NITROGEN OXIDE COMPOUNDS

(71) Applicant: SHELL OIL COMPANY, Houston, TX (US)

(72) Inventors: Wenzhong Zhang, Houston, TX (US); Geert Marten Bakker, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 47 days.

(21) Appl. No.: 16/335,399

(22) PCT Filed: Sep. 25, 2017

(86) PCT No.: PCT/EP2017/074234
§ 371 (c)(1),
(2) Date: Mar. 21, 2019

(87) PCT Pub. No.: WO2018/055162
PCT Pub. Date: Mar. 29, 2018

(65) Prior Publication Data
US 2019/0282959 A1  Sep. 19, 2019

Related U.S. Application Data

(60) Provisional application No. 62/399,543, filed on Sep. 26, 2016.

(51) Int. Cl.
| | | |
|---|---|---|
| *B01D 53/96* | (2006.01) | |
| *B01D 53/86* | (2006.01) | |
| *B01J 38/08* | (2006.01) | |
| *B01J 21/06* | (2006.01) | |
| *B01J 23/30* | (2006.01) | |
| *B01J 23/28* | (2006.01) | |
| *B01J 23/22* | (2006.01) | |
| *B01J 23/92* | (2006.01) | |
| *B01J 21/20* | (2006.01) | |

(52) U.S. Cl.
CPC ......... *B01D 53/96* (2013.01); *B01D 53/8625* (2013.01); *B01J 21/063* (2013.01); *B01J 21/20* (2013.01); *B01J 23/22* (2013.01); *B01J 23/28* (2013.01); *B01J 23/30* (2013.01); *B01J 23/92* (2013.01); *B01J 38/08* (2013.01); *B01D 2251/2062* (2013.01); *B01D 2257/404* (2013.01); *B01D 2258/0283* (2013.01)

(58) Field of Classification Search
CPC .. B01D 53/56; B01D 53/565; B01D 53/8625; B01D 53/96; B01D 2251/2062; B01D 2257/402; B01D 2257/404; B01D 2258/0283; B01J 15/005; B01J 19/00; B01J 19/24; B01J 23/90; B01J 38/04; B01J 38/06; B01J 38/08
See application file for complete search history.

(56) References Cited

U.S. PATENT DOCUMENTS

| | | | | |
|---|---|---|---|---|
| 2009/0247392 A1* | 10/2009 | Ghorishi | ............ | B01D 53/8628 502/27 |
| 2014/0237995 A1* | 8/2014 | Yezerets | .................. | B01J 38/06 60/295 |
| 2019/0083967 A1* | 3/2019 | Yang | ...................... | F01N 3/2828 |

FOREIGN PATENT DOCUMENTS

| | | | | | |
|---|---|---|---|---|---|
| CN | 105 688 936 A | * | 6/2016 | .............. | B01J 23/92 |
| CN | 108 722 436 A | * | 11/2018 | .............. | B01J 23/92 |
| EP | 0136966 A2 | | 4/1985 | | |
| EP | 0303560 A1 | | 2/1989 | | |
| EP | 1870155 A1 | * | 12/2007 | ......... | B01D 53/8696 |
| EP | 2486971 A1 | | 8/2012 | | |
| EP | 2570177 A1 | | 3/2013 | | |
| EP | 2321035 B1 | * | 2/2016 | ............. | F23J 15/006 |
| EP | 3015670 A1 | * | 5/2016 | ........... | F01N 3/2053 |
| JP | 52-111463 A | * | 9/1977 | ............. | B01D 53/94 |
| JP | S52150795 A | | 12/1977 | | |

OTHER PUBLICATIONS

International Search Report and Written Opinion received for PCT Patent Application No. PCT/EP2017/074234, dated Nov. 27, 2017, 9 pages.
International Search Report and Written Opinion received for PCT Patent Application No. PCT/EP2017/074241, dated Nov. 22, 2017, 9 pages.

* cited by examiner

*Primary Examiner* — Timothy C Vanoy

(57) ABSTRACT

The invention provides a method of reducing the amount of nitrogen oxide components in a process gas stream comprising: a) contacting a deNO$_X$ catalyst with the process gas in the presence of ammonia which results in the conversion of nitrogen oxide components as well as a decline in the NO$_X$ conversion over the deNO$_X$ catalyst; and b) regenerating the deNO$_X$ catalyst to improve the NO$_X$ conversion by contacting the deNO$_X$ catalyst at a temperature in the range of from 250 to 390° C. with a flow of ammonia that is reduced relative to the flow of ammonia in step a) and process gas, air or a mixture thereof.

24 Claims, No Drawings

METHOD OF REDUCING NITROGEN OXIDE COMPOUNDS

PRIORITY CLAIM

The present application is the National Stage (§ 371) of International Application No. PCT/EP2017/074234, filed 25 Sep. 2017, which claims priority from U.S. Patent Application No. 62/399,543, filed 26 Sep. 2016 incorporated herein by reference.

FIELD OF THE INVENTION

The invention relates to a method for reducing the amount of nitrogen oxide components in a process gas stream and a method for regenerating a deNO$_X$ catalyst.

BACKGROUND

Process gas, such as combustion exhaust gas streams and that from other processes, for example processes in a caprolactam plant, typically contain nitrogen oxides, NO$_X$, that are produced during the process or combustion. One process for reducing the level of nitrogen oxides is the selective catalytic reduction (SCR) process. In this process, nitrogen oxides are converted over a deNO$_X$ catalyst to nitrogen and water using ammonia or substances which form ammonia under the SCR conditions.

The process gas stream may also comprise various contaminants that are a result of the process or combustion step, for example, sulfur dioxide, sulfur trioxide, phosphorous, heavy metals, alkali metals and alkaline earth metals. These contaminants may cause fouling and/or poisoning of the deNO$_X$ catalyst which results in reduced NO$_X$ conversion over the catalyst. The catalyst performance can degrade to the point where a regeneration step is required to regain the loss of NO$_X$ conversion rate or else the catalyst would have to be replaced. Various deNO$_X$ catalyst regeneration methods have been described in the prior art, but these typically require the removal of the catalyst from the process for washing with a liquid or for thermally treating at high temperatures, in excess of 400° C. It would be advantageous to develop a regeneration method that could be carried out without taking the catalyst off-line or allowing the catalyst to be thermally regenerated at a lower temperature or in a shorter period of time.

SUMMARY OF THE INVENTION

The invention provides a method of reducing the amount of nitrogen oxide components in a process gas stream comprising: a) contacting a deNO$_X$ catalyst with the process gas in the presence of ammonia which results in the conversion of nitrogen oxide components as well as a decline in the NO$_X$ conversion over the deNO$_X$ catalyst; and b) regenerating the deNO$_X$ catalyst to improve the NO$_X$ conversion by contacting the deNO$_X$ catalyst at a temperature in the range of from 250 to 390° C. with a flow of ammonia that is reduced relative to the flow of ammonia in step a) and process gas, air or a mixture thereof.

The invention further provides a method of regenerating a deNO$_X$ catalyst that has been deactivated while contacting the catalyst with a stream comprising process gas and ammonia, comprising: reducing the flow of ammonia and continuing to contact the catalyst with process gas.

DETAILED DESCRIPTION

The invention provides an improved method for regenerating deNO$_X$ catalyst, especially deNO$_X$ catalyst showing a reduced NO$_X$ conversion caused by sulfur-containing compounds in the process gas. This provides an improved NO$_X$ reduction process with extended catalyst life and reduced downtime of the deNO$_X$ unit(s).

The deNO$_X$ catalyst may be any deNO$_X$ catalyst known in the art for reducing the concentration of nitrogen oxides in a process gas stream. The deNO$_X$ catalyst may contain titanium, tungsten, molybdenum, vanadium or other compounds known to be suitable for the conversion of nitrogen oxides to nitrogen and water. The catalyst may be in any suitable shape or it may be a wash coat on a substrate, for example the catalyst may be an extruded honeycomb, a wash coated metal plate, a wash coated corrugated plate or on a foam substrate. In another embodiment, the catalyst may be in the form of pellets.

The process gas may be produced in heaters, furnaces, direct fired boilers, or by any other combustion process or other process. The process gas may contain any number of products, including carbon monoxide, carbon dioxide, nitrogen oxides, sulfur compounds, and other contaminants present in the feed streams that are combusted or otherwise processed in addition to particulates which may contain phosphorous, heavy metals, alkali metals and alkaline earth metals. The sulfur compounds may be sulfur oxides, for example sulfur dioxide and sulfur trioxide. The sulfur compounds are typically generated as a result of sulfur being present in the feed streams, which could include fuel oil or other hydrocarbon streams, coal or waste such as municipal waste, industrial waste and hospital waste.

The process gas may also comprise steam. The process gas stream may comprise at least 10 vol % steam. In another embodiment, the process gas stream may comprise at least 20 vol % steam.

The process gas may be treated for the removal of any or all of these products and contaminants, and the treating is typically determined by the relevant environmental regulations. The process gas is passed through one or more treatment zones that may comprise one or more catalysts. For example, the process gas may be passed through electrostatic precipitators or fabric filters to remove a portion of the particulates and acid gas removal systems to remove a portion of the acid gases including sulfur dioxide and sulfur trioxide.

The process gas is contacted with a deNO$_X$ catalyst, typically in the presence of ammonia, to convert the nitrogen oxides to nitrogen and water. The catalyst may present in a catalyst module, for example a honeycomb or plate type catalyst module as well as a lateral flow reactor, radial flow reactor or axial flow reactor. The deNO$_X$ reaction may be conducted at a temperature of from 140 to 300° C.

Over time, the NO$_X$ conversion over the deNO$_X$ catalyst is reduced. This may be a result of the active sites being physically covered, i.e., with particulates and/or the active sites chemically reacting with other process gas components in a way that they are no longer active for nitrogen oxide conversion. Dust and/or other particulates from the process gas may be physically deposited on the catalyst surfaces, and over time more and more sites will be obscured. Ammonium sulfate, ammonium bisulfate and other ammonium salts, such as ammonium chloride and ammonium nitrate, may form through the reaction of injected ammonia with components in the process gas. These ammonium salts may condense or otherwise deposit on the catalyst increasing the sulfur concentration on the catalyst.

In addition, sulfur compounds, such as sulfur oxides may deposit on the catalyst, to increase the sulfur concentration on the catalyst and result in a reduction in NO$_X$ conversion.

As the process gas passes across the deNO$_X$ catalyst, the concentration of sulfur deposited on the catalyst increases. The sulfur content may increase to a concentration of more than 0.2 wt % on the catalyst, calculated as elemental sulfur as a percentage of the total weight of the catalyst. The amount of sulfur on the catalyst may increase even higher to 1.0 wt % or 2 wt % or even higher concentrations. The NO$_X$ conversion over the catalyst will be reduced as a result of this concentration of sulfur on the catalyst.

In order to regenerate the deNO$_X$ catalyst, the flow of ammonia is reduced during the regeneration step. The flow of ammonia in the regeneration step may be reduced to less than 50% of the flow of ammonia used in the deNO$_X$ step. The flow of ammonia in the regeneration step is preferably reduced to less than 10% of the flow of ammonia used in the deNO$_X$ step. The flow of ammonia in the regeneration step is more preferably reduced to less than 2% of the flow of ammonia used in the deNO$_X$ step. The flow of ammonia in the regeneration step may be reduced to zero.

In one embodiment, the regeneration step may include the addition of steam. The steam may be produced in other units nearby, be part of the steam utility system or be produced in the same processes that produce the process gas to be treated. This last embodiment is especially useful because the steam is produced at almost the same place as where it needs to be used for the regeneration. In this embodiment, the amount of steam that is needed will depend on the amount of steam that is already present in the process gas.

The regeneration may be carried out at the same temperature that the process gas contacts the catalyst or the steam may provide sufficient heat to heat the catalyst to a higher temperature during the regeneration. Alternatively, heat may be provided by heaters or other heat sources. The regeneration temperature is preferably in the range of from 250 to 390° C., more preferably in the range of from 250 to 370° C., and even more preferably in the range of from 290 to 350° C. In another embodiment, the temperature may be in the range of from 310 to 350° C.

The pressure in the regeneration step is typically at or near ambient pressure.

During the regeneration step, in addition to the process gas, and optionally steam, the catalyst may be contacted with a flow of air. Since the process gas continues to pass through the catalyst, then the underlying process does not have to be stopped during the regeneration step.

The flow of process gas may be reduced during the regeneration step. The flow may be reduced to 50% of its normal flow, preferably 25% of its normal flow, more preferably to 10% of its normal flow and most preferably to 5% of its normal flow. The flow may be reduced to from 2 to 5% of its normal flow. In one embodiment, the flow of the process gas may be stopped.

The steam and optionally air flow through the catalyst during the regeneration step can unlock ammonium salts which are then decomposed and removed. This improves the performance of the catalyst and helps to return the NO$_X$ conversion rate to at least 50% of the NO$_X$ conversion rate of fresh catalyst.

The regeneration step also removes sulfur compounds present on the catalyst. The regeneration can reduce the level of sulfur on the catalyst to less than 1.3 wt %, preferably less than 0.9 wt % and more preferably to less than 0.6 wt % of sulfur on the catalyst.

The regeneration may be carried out for a sufficient time period to restore the catalyst to at least 50% of its initial NO$_X$ conversion rate, preferably at least 80% of its original NO$_X$ conversion rate, more preferably at least 90% of its initial NO$_X$ conversion rate, and even more preferably at least 95% of its initial NO$_X$ conversion rate. The regeneration may be carried out for a time period of from 5 to 168 hours, preferably from 12 to 72 hours, and more preferably from 24 to 48 hours.

EXAMPLE

In this example, deNO$_X$ catalyst was contacted with a process gas stream and then regenerated to restore its NO$_X$ conversion. First, the deNO$_X$ catalyst was contacted with ammonia and a process gas stream containing NO$_X$ and 20 ppm of sulfur dioxide at a temperature of 170° C. for 30 hours. The regeneration was carried out by stopping the flow of ammonia and continuing to contact the catalyst with the process gas stream for 24 hours at a temperature of 250° C. A second regeneration step was carried out on the same catalyst after the first regeneration by continuing to contact the catalyst with the process gas stream at a temperature of 300° C. for an additional 24 hours. The sulfur content on the catalyst and the NO$_X$ conversion of the catalyst are shown in Table 1.

TABLE 1

| | Fresh catalyst | After contacting with process gas | After 1$^{st}$ regeneration | After 2$^{nd}$ regeneration |
|---|---|---|---|---|
| Sulfur (wt %) | | 0.74 | 0.58 | |
| Conversion (%) | 100 | 58.9 | 59.4 | 96.1 |

As can be seen from the table, the regeneration process comprising continuing to contact the catalyst with process gas in the absence of ammonia under regeneration conditions is effective in restoring the conversion of the deNO$_X$ catalyst to or close to its original conversion.

That which is claimed is:

1. A method of reducing the amount of nitrogen oxide components in a process gas stream comprising:
  a. contacting a deNOx catalyst with the process gas in the presence of ammonia which results in the conversion of nitrogen oxide components as well as a decline in the NOx conversion over the deNOx catalyst; and
  b. regenerating the deNOx catalyst to improve the NOx conversion by contacting the deNOx catalyst at a temperature in the range of from 250 to 390° C. with a flow of ammonia that is reduced relative to the flow of ammonia in step a) and process gas, air or a mixture thereof.

2. The method of claim 1 wherein step a) is carried out at a temperature in the range of from 140 to 300° C.

3. The method of any of claim 1 wherein the flow of ammonia in step b) is reduced to less than 50% of the flow of ammonia used in step a).

4. The method of any of claim 1 wherein the flow of ammonia in step b) is reduced to less than 10% of the flow of ammonia used in step a).

5. The method of any of claim 1 wherein the flow of ammonia in step b) is reduced to less than 2% of the flow of ammonia used in step a).

6. The method of any of claim 1 wherein the regeneration is carried out at a temperature in the range of from 260 to 350° C.

7. The method of any of claim 1 wherein the deNOx catalyst is not contacted with process gas.

8. The method of any of claim 1 wherein the NOx is at least partially converted to water and nitrogen.

9. The method of any of claim 1 wherein steam is present in the process gas.

10. The method of any of claim 1 wherein the process gas comprises at least 10 vol % steam.

11. The method of any of claim 1 wherein the process gas comprises at least 20 vol % steam.

12. The method of claim 1 wherein additional steam is added to the process gas.

13. The method of claim 1 wherein the process gas additionally comprises sulfur compounds.

14. The method of claim 13 wherein the sulfur compounds comprise sulfur dioxide and/or sulfur trioxide.

15. The method of claim 1 wherein the decline in NOx conversion is at least partially caused by the presence of sulfur and/or sulfur compounds on the deNOx catalyst.

16. The method of claim 15 wherein the deNOx catalyst after step a) has a sulfur content of at least 0.6 wt %.

17. The method of claim 1 wherein the sulfur content on the deNOx catalyst is reduced in step b) to less than 0.6 wt %.

18. The method of claim 1 wherein sulfur in the form of ammonium sulfate and/or ammonium bisulfate is removed from the catalyst in step b).

19. The method of claim 1 wherein the regeneration is carried out for a time period of from 5 to 168 hours.

20. The method of claim 1 wherein the regeneration is carried out for a time period of from 24 to 48 hours.

21. The method of claim 1 wherein the deNOx catalyst comprises one or several of the following elements: titanium, tungsten, molybdenum, vanadium or other compounds known to be suitable for the conversion of nitrogen oxides to nitrogen and water.

22. A method of regenerating a deNOx catalyst that has been deactivated while contacting the catalyst with a stream comprising process gas and ammonia, comprising: reducing the flow of ammonia and continuing to contact the catalyst with process gas.

23. The method of claim 22 wherein the flow of process gas is reduced.

24. The method of claim 22 wherein the ammonia flow is reduced to less than 1%.

* * * * *